United States Patent
Nakamura et al.

(10) Patent No.: US 6,816,304 B2
(45) Date of Patent: Nov. 9, 2004

(54) VARIABLE MAGNIFICATION MICROSCOPE

(75) Inventors: Katsushige Nakamura, Hachioji (JP); Masao Doi, Fuchu (JP); Masakazu Nakamura, Mitaka (JP)

(73) Assignee: Mitaka Kohki Co., Ltd., Tokyo (JP)

( * ) Notice: Subject to any disclaimer, the term of this patent is extended or adjusted under 35 U.S.C. 154(b) by 36 days.

(21) Appl. No.: 10/327,911

(22) Filed: Dec. 26, 2002

(65) Prior Publication Data

US 2003/0133188 A1 Jul. 17, 2003

(30) Foreign Application Priority Data

Dec. 28, 2001 (JP) ........................................ 2001-400052

(51) Int. Cl.[7] .......................... G02B 21/06; G02B 21/00
(52) U.S. Cl. ........................ 359/388; 359/368; 359/380; 359/385
(58) Field of Search ................................ 359/368–390, 359/422–432; 351/200–247

(56) References Cited

U.S. PATENT DOCUMENTS

| | | | | |
|---|---|---|---|---|
| 3,459,464 A | | 8/1969 | Smith | 359/376 |
| 3,895,854 A | | 7/1975 | Ziffer | 359/372 |
| 4,547,047 A | * | 10/1985 | Koike et al. | 359/375 |
| 5,140,458 A | * | 8/1992 | Takagi et al. | 359/380 |
| 5,296,962 A | * | 3/1994 | Furuhashi | 359/388 |
| 5,822,114 A | * | 10/1998 | Hanzawa | 359/380 |
| 5,859,727 A | | 1/1999 | Tsuchiya | 359/387 |
| 6,292,214 B1 | * | 9/2001 | Sakano | 348/79 |
| 6,473,329 B1 | | 10/2002 | Nakamura | 359/377 |
| 6,624,932 B2 | * | 9/2003 | Koetke | 359/389 |
| 2001/0003490 A1 | | 6/2001 | Kawasaki et al. | 359/385 |

FOREIGN PATENT DOCUMENTS

| | | |
|---|---|---|
| DE | 1 293 470 | 4/1969 |
| GB | 348 202 | 5/1931 |
| JP | 62-166311 | 7/1987 |
| JP | 7-113959 | 5/1995 |
| JP | 8-10264 | 1/1996 |
| JP | 2002-98899 | 4/2002 |

* cited by examiner

Primary Examiner—Thong Q Nguyen
(74) Attorney, Agent, or Firm—Oblon, Spivak, McClelland, Maier & Neustadt, P.C.

(57) ABSTRACT

A fixed-high-power-switching microscope including a usual variable power optical system which can be switched to a fixed high power high resolution optical system, as necessary, is provided. The microscope includes a second optical axis for the fixed high power bypassing the variable power optical system. A prism (reflecting element) movable into and out of a first optical axis switches a viewing optical path from the first optical axis for the variable usual power to the second optical axis for the fixed high power, as necessary, providing a clear magnified image at high magnification and high resolution.

13 Claims, 4 Drawing Sheets

VARIABLE MAGNIFICATION MICROSCOPE

BACKGROUND OF THE INVENTION

1. Field of the Invention

This invention relates to a fixed-high-power-switching microscope especially for use in medical practice, which can be switched from a usual variable magnification to a fixed high magnification during viewing, as necessary.

2. Description of the Related Art

In the medical field, microscopes for use in surgical operations are stereoscopic microscopes (stereomicroscopes) which provide stereoscopic views of affected areas. More specifically, a stereomicroscope guides two-channel beams of light reflected off an affected area via an objective optical system, a variable power optical system and an eyepiece optical system to the two eyes of a doctor. The doctor, with the eyes fixed to the eyepiece optical system for viewing, magnifies the affected area within the view by means of the variable power optical system (zooming), as necessary, conducting necessary procedure to the affected area with the hands extended.

SUMMARY OF THE INVENTION

However, such a conventional microscope having a variable power optical system has a magnification limit in providing a clear high-resolution view of an affected area. More specifically, a variable power optical system has a limit in magnification (some 25 times) and cannot provide sufficient resolution when the magnification is increased thereover, resulting in a blurred image of an object being viewed. The conventional microscope thus has limited application in surgical operations, and cannot be used for connection of small blood vessels (of a diameter of some hundreds of micro-meters) for cure of a severed finger or for a surgical operation on a cultured tissue produced by biotechnology.

In this context, the provision of a microscope which provides high-resolution views without blurring images at a high magnification exceeding usual magnifications (hereinafter referred to as "low magnifications") has been expected. It is not practical to manufacture a high-magnification/high-resolution microscope with a variable power optical system excluded, for exclusive use in microsurgery because it becomes necessary to exchange the microscope in its entirety when usual magnifications are required for entire viewing. Thus the provision of a microscope which can be used both in surgical operations at usual magnifications for a wide field of view and in microsurgery at high magnification and high resolution has been expected.

This invention has been made to meet such a demand, and provides a variable magnification microscope equipped with a low-magnification optical system which can be easily switched to a high-resolution optical system.

According to a first technical aspect of this invention, there is provided a variable magnification microscope having an objective optical system, a variable power optical system, an eyepiece optical system where the variable power optical system and the eyepiece optical system being arranged on a first optical axis passing through the objective optical system, a high power optical system arranged on a second optical axis where the second optical axis bypassing the variable power optical system between the objective optical system and the eyepiece optical system, and a reflecting means selectively disposed in the first optical axis between the objective optical system and the variable power optical system where the reflecting means diverting the first optical axis to the second optical axis.

According to a second technical aspect of this invention, the variable magnification microscope further has a first illuminating system for illuminating a field of view of the variable power optical system, and a second illuminating system for illuminating a field of view of the high power optical system, wherein with the variable power optical system selected, illuminating light only from the first illuminating system is emitted, and with the high power optical system selected, illuminating light from the first and the second illuminating systems is emitted.

According to a third technical aspect of this invention, there is provided an illuminating system for a microscope including a first optical system having a light source for producing a parallel light beam, a first reflecting means, a second reflecting means where between the first reflecting means and the second reflecting means the main axis of an optical path of the parallel light beam being parallel with the main axis of the first optical system and the second reflecting means being fixed relative to the first optical system, and a third reflecting means fixed relative to the first optical system where the third reflecting means being off the main axis of the first optical system, the optical path of the parallel light beam passing via the second reflecting means and the third reflecting means and intersecting the main axis of the first optical system at the focal position of the first optical system.

DESCRIPTION OF THE PREFERRED EMBODIMENTS

Figure 3A:
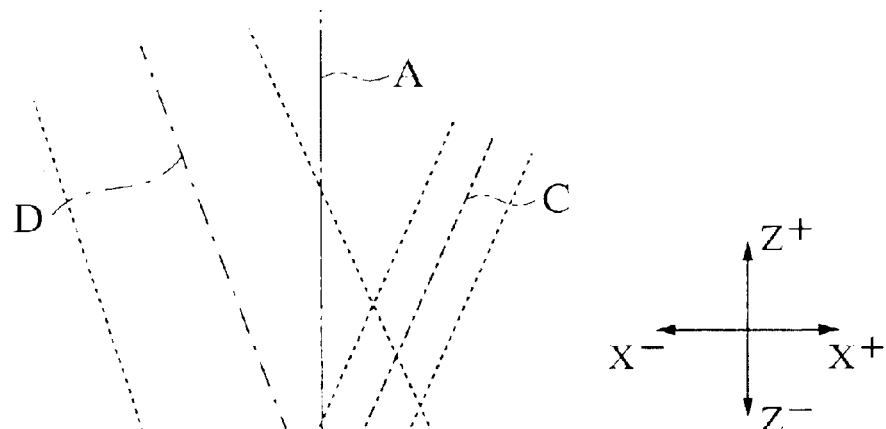
FIG. 3A is an enlarged view of a focal plane and the vicinity of an objective lens in FIG. 2.
Figure 3B:
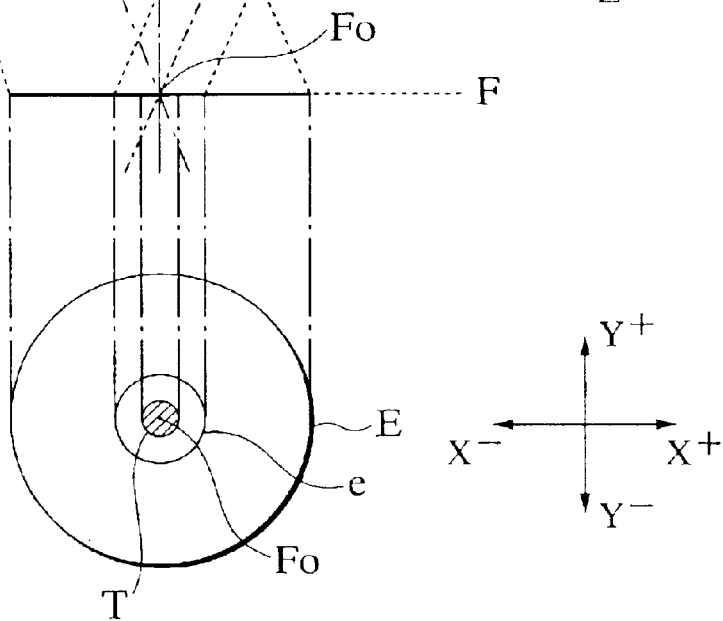
FIG. 3B illustrates a low-power field of view (E) and a high-power field of view (e)
Figure 4:
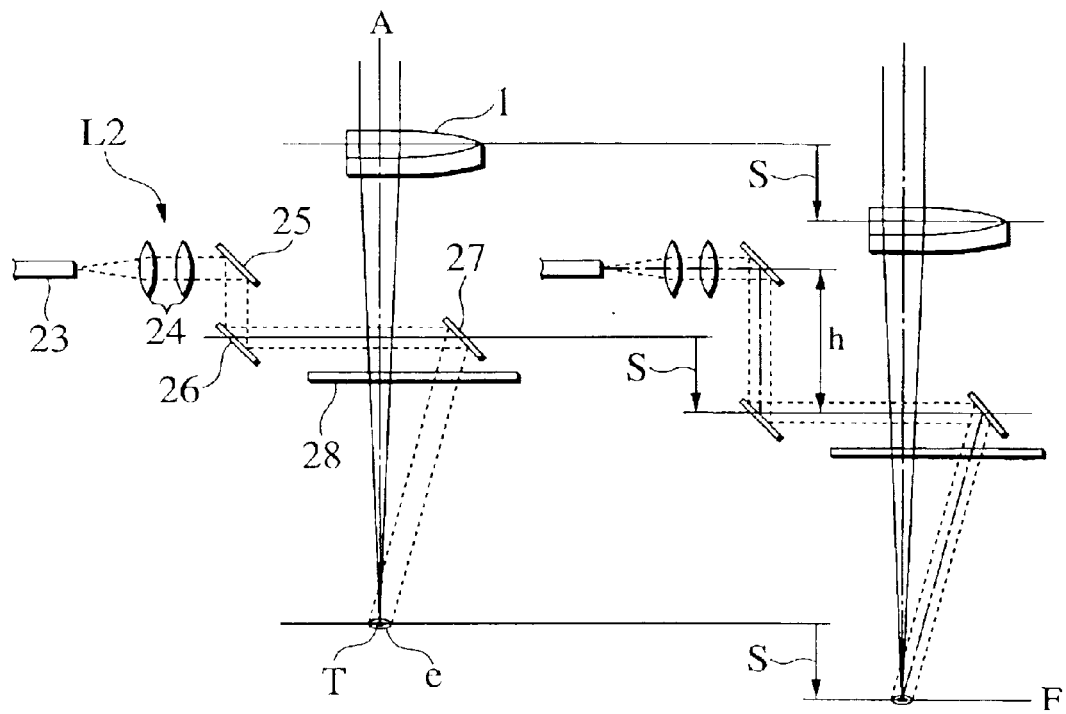
FIG. 4 is a schematic diagram illustrating a second illuminating system whose mirrors move up and down in conjunction with the objective lens.
Figure 5:
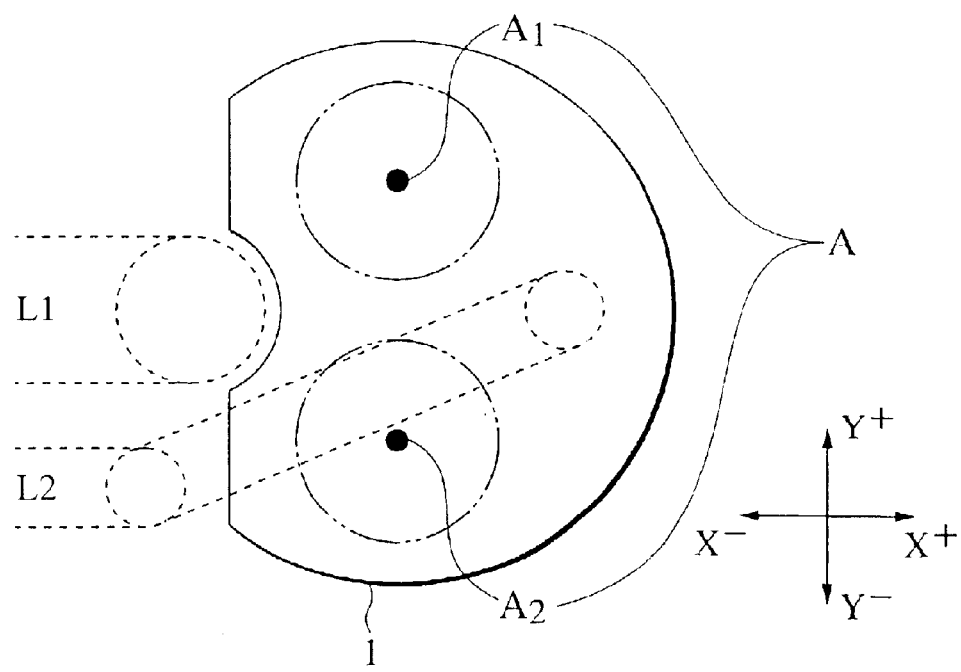
FIG. 5 is a plan view illustrating the shape of the objective lens.

With reference to FIGS. 1 to 5, a preferred embodiment of this invention will be described below. A microscope according to this embodiment is used as an operation microscope which allows stereoscopic viewing. The microscope has a first optical axis A extending in a substantially vertical direction (Z direction) for viewing an affected area T from immediately above. The first optical axis A extends upward ($Z^+$) from an object viewed through an objective optical system including an objective lens 1. As shown in FIG. 5, above the objective lens 1, the first axis A is split into two optical axes ($A_1$, $A_2$) in parallel in a direction perpendicular to the sheet surfaces of FIGS. 1 and 2 ($Y^+,Y^-$). The rear ($X^-$) of the objective lens 1 has a cut shape to avoid interference with an illuminating system to be described below. On the first optical axis A, a variable power optical system 2 including four lenses, an imaging lens 3, a beam splitter 4 as an optical coupling means, and an eyepiece optical system including a variable lens-barrel 5 and an eyepiece 6 are arranged.

The lenses of the variable power optical system 2 of low magnifications are paired into two pairs. The two pairs of the lenses can be made close to or distanced from one other to vary the magnification. The variable power optical system 2 is a low-power optical system with the magnification varied in a range from 4 times to 24 times. A low-power optical system does not need to have high resolution because it is used for viewing a wider field than a view used in microsurgery to be described later. The first optical axis A is bent at its upper end portion forward ($X^+$) at a substantially right angle by the beam splitter 4, to be connected to the eyepiece optical system 5 and 6. The eyepiece optical system has a known inside optical structure and will not be described.

Above the beam splitter 4 ($Z^+$), another beam splitter 7 is disposed. The optical axis A' extending from the beam splitter 4 is connected through an imaging lens 8 and a magnifying lens 9 to an opposite eyepiece optical system 10 and 11 for an assistant. The opposite eyepiece optical system includes a variable lens-barrel 10 and an eyepiece 11. Above the upper beam splitter 7, a prism 12 is disposed. Beams of light passing through the upper beam splitter 7 are reflected off the prism 12 to the rear ($Z^-$) for forming an image on an image surface (light-receiving surface) of an imaging device such as a television camera 13.

Between the objective lens 1 and the lenses 2 of the variable power optical system, a prism 14 is provided as a reflecting means which is movable into and out of the first optical axis A. The prism 14 is a selective reflecting means and serves as an optical path switching element. A mirror may be used in place of the prism 14. The prism 14 reflects beams of light reflected off the affected area T at a right angle in a rearward direction. A second optical axis B consists of two second optical axes ($B_1$, $B_2$) split in parallel in a direction perpendicular to the sheet surfaces of FIGS. 1 and 2 ($Y^+$,$Y^-$), corresponding to the two first optical axes ($A_1$, $A_2$). When the prism 14 is disposed in the first optical axis A, the optical path is changed at the prism 14 into the second optical axis B and is optically connected to the first optical axis A at the beam splitter 4. Since a high-resolution optical system 30 is disposed in the second optical axis B bypassing the variable power optical system, selection in position of the prism 14 results in selection between the low-power optical system and the high-resolution optical system. The length of the optical path connecting the prism 14 and the beam splitter 4 via the second optical axis B is greater than the length of the optical path connecting them via the first optical axis A.

The second optical axis B extends in a direction different from that of the eyepiece 6 of the eyepiece optical system with respect to the first optical axis A, and preferably detours to the opposite side ($X^-$) to the eyepiece 6 of the eyepiece optical system with respect to the first optical axis A. The disposition of the high-resolution optical system 30 in the optical axis extending in a perpendicular direction (X direction) to the first optical axis A allows high-resolution viewing without changing the height of the eyepiece optical system, independent of the length of the high-resolution optical system. Since the external shape of the microscope has no forward bulge (toward the eyepiece optical system), the external shape of the microscope does not interfere with viewing of the affected area T from the vicinity of the eyepiece optical system. A doctor, when shifting the eyes from the eyepiece 6 to check the affected area T by the naked eyes, can easily conduct macroscopic observation without interference with the field of view.

Figure 1:
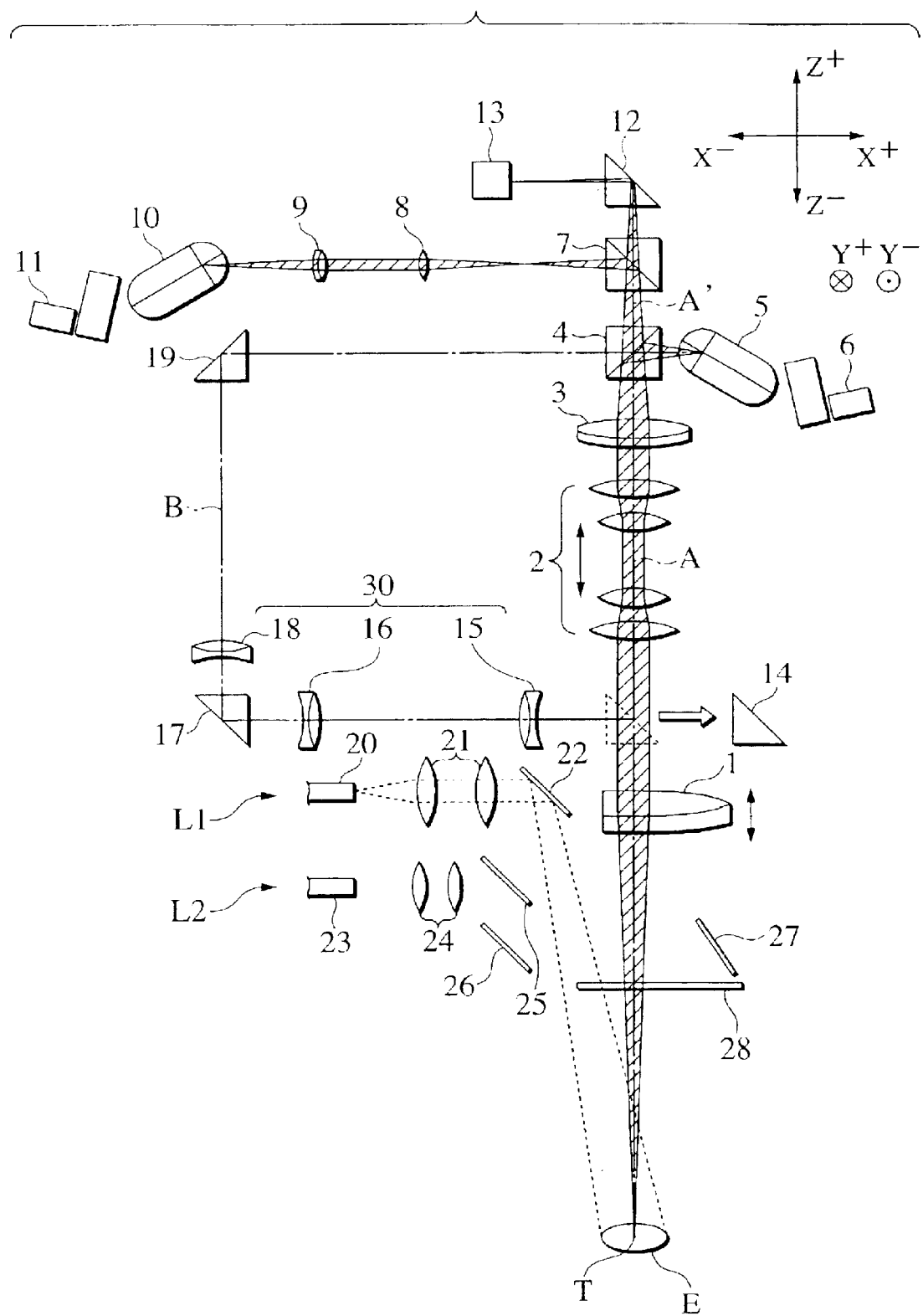
FIG. 1 is a schematic diagram of a microscope according to the invention, illustrating the state of use of a variable low power optical system (first optical axis)
Figure 2:
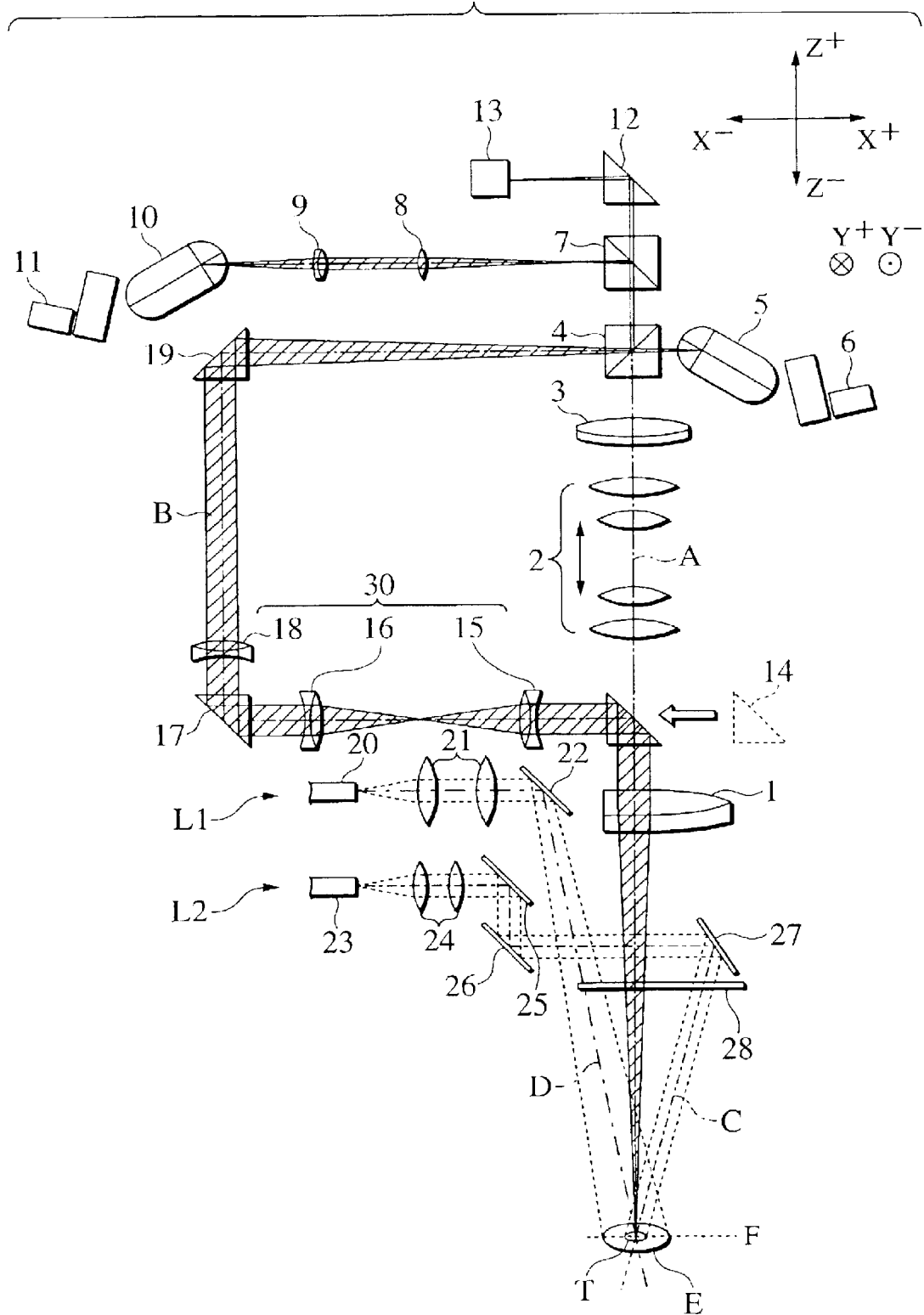
FIG. 2 is a schematic diagram of the microscope, illustrating the state of use of a fixed-high-power optical system (second optical axis)

On the second optical axis B, an imaging lens 15, a magnifying lens 16, a prism 17, a magnifying lens 18 and a prism 19 are arranged in this order. The second optical axis B merges with the first optical axis A at the beam splitter 4. The optical elements arranged on the second optical axis B constitute a high-resolution optical system capable of performing magnification at a high magnification of, e.g., 50 times and a high resolution. In the embodiment of FIGS. 1 and 2, the two prisms 17 and 19 are used as optical elements for lengthening the optical length of the second optical axis B. A larger number of optical elements may be used for that purpose, depending on the location of the high-resolution optical system 30. The high-resolution optical system 30 can be disposed at any place on the diverted second optical axis B. The microscope may be configured to have a plurality of high-resolution optical systems 30 to be selectively switched on the second optical axis B.

This invention includes a second optical axis bypassing a variable power optical system of low magnifications, for a high-resolution fixed-high-power optical system, and includes a reflecting means movable into and out of a first optical axis, for switching a viewing optical path from the first optical axis for variable low power to the second optical axis for fixed high resolution/high power, as necessary, thereby providing a clear magnified image at high power and high resolution. It is also possible to switch to the first optical axis for low power, quickly providing low magnifications usually used for entire viewing, as required. The putting in and out of the reflecting means may be done automatically or manually.

Microscope Illuminating Optical System

Below the microscope ($Z^-$), a first illuminating system L1 for illuminating the wide field of view E for the low-power optical system 2 and a second illuminating system L2 for illuminating the narrow field of view e for the high-resolution optical system 30 are provided. The first illuminating system L1 includes a fiber 20 extended from a light source, two lenses 21 and a mirror 22, and can obliquely emitting illuminating light having a given width and a main axis D, from the rear to the affected area T. More specifically, as shown in FIG. 1, the mirror 22 is arranged aside the first optical axis A, and the main axis of the illuminating light beam passes through a main axis A of the objective lens 1 or the periphery at a focal position F of the objective lens 1. The fiber 20 and the lenses 21 serve as a first optical source for transmitting a beam of light of a given width.

The second illuminating system L2 as a collimator includes a fiber 23 extended from a light source, two lenses 24 and three mirrors 25, 26 and 27, for emitting a parallel light beam from the lenses 24 and obliquely illuminating from the forward the affected area T lying in the vicinity of the focal position of the objective lens 1. More specifically, as shown in FIGS. 2 and 3, the mirror 27 is arranged aside the first optical axis A with a main axis C of the parallel light beam intersecting the main axis A of the objective lens 1 at the focal position F of the objective lens 1. The fiber 23 and the lenses 24 serve as a secondary light source for transmitting a parallel light beam. The optical axis of the second illuminating system L2 between the mirrors 25 and 26 is always in parallel with the first optical axis A regardless of movement of the mirror 26 as shown in FIG. 4. Also, the optical axis of the second illuminating system L2 between the mirrors 26 and 27 is relatively fixed, typically perpendicular to the first optical axis A and parallel (X) with a cover glass 28. Since illuminating the narrow field of view as depicted by "e" in FIGS. 3B and 4, the parallel beam of the second illuminating system L2 is thinner than the light beam of the first illuminating system L1.

Below the two mirrors 26 and 27, the cover glass 28 is provided, through which the first optical axis A passes. The cover glass 28 and the two mirrors 26 and 27 are configured in a unit and are connected to the objective lens 1 via a bracket not shown and fixed relative to the objective lens 1. Thus, as shown in FIG. 4, when the objective lens 1 vertically moves along the first optical axis A for focusing, the mirrors 26 and 27 and the cover glass 28 also vertically conjunctively moves (±Z) by the same stroke. Thus the mirrors 26 and 27 are fixed relative to the objective lens 1. When the objective lens 1 moves, since the optical path extending from the mirror 26 to a viewed area T is relatively fixed, the main axis C of the optical path always intersects the first optical axis A at a focus point $F_0$ despite the fact that the mirror 27 is off the first optical axis A (See FIG. 3). Thus change of distance h between the mirrors 25 and 26 caused by vertical movement of the objective lens 1 does not change the position of the optical axis of the second illuminating system L2 from the mirror 26 to the object T, resulting in no change of the width and direction of the light beam. Since the first illuminating system L1 illuminates a wide range around the affected area T, movement of the objective lens 1 does not change the illuminating range so much. The first illuminating system L1 is thus not required to move in conjunction with the objective lens 1. The first and second illuminating systems L1 and L2 preferably provide illumination in different directions from one another with respect to the main axis A of the objective lens 1 so as to compensate for shades of the other illumination, and more preferably provide illumination in opposite directions with respect to the main axis A of the objective lens 1.

(i) The second illuminating system L2 as a collimator can illuminate a given region (area) regardless of change of the optical path by using a parallel light beam, and (ii) the position of the optical axis C extending from the mirror 26 toward the focal plane F is not changed relative to the focal point $F_0$ by change of the distance h. As a result, movement of the objective lens 1 does not change the area, intensity of illumination and illuminating position of the illuminated area T in the focal plane F. Further, intersecting of the first optical axis A with the optical axis C of the second illuminating system L2 at the focus $F_0$ provides the maximum illumination to an object within the field of view in the vicinity of the focal position when the focus is adjusted using the high-resolution optical system 30, facilitating focus adjustment.

According to this embodiment, the prism 14 as a reflecting means is put out of the first optical axis A to allow light beams reflected off the affected area T to be guided along the first optical axis A to the eyepiece 6 of the eyepiece optical system. A doctor viewing the eyepiece 6 can obtain the wide field of view E at low power, varying the magnification. At this time, illuminating light only from the first illuminating system L1 is emitted to the affected area T.

Then, in the case of operating on the smallest part in connecting surgery of small blood vessels of a diameter of some of hundreds of micro-meters, for example, the prism 14 is put into the first optical axis A to guide light beams reflected off the affected area T toward the second optical axis B. The optical elements arranged on the second optical axis B provide a high magnification as such 50 times, allowing reliable microsurgery such as stitching together small blood vessels with a very thin thread. The second optical axis B is not provided with a variable power optical system, thus providing a viewing image at high resolution and high magnification.

In switching to the second optical axis B of the high-resolution optical system, the second illuminating system L2 is also lighted. The light is superposed on the illuminating light of the first illuminating system L1 to illuminate the affected area T, providing an intensity of light sufficient for the surgery, and thus preventing darkening of the field of view e at high magnification. Movement of the prism 14 may be detected by a switch or a location sensor to control drive of the illuminating systems, thereby to make the illuminating systems operate in conjunction with the switching between the optical axes.

Further, the mirrors 26 and 27 of the second illuminating system L2 vertically move in conjunction with the objective lens 1, causing no change in the optical axis of L2, so that the illuminating light beam, though being a thin and oblique radiation, of the second illuminating system L2 can continuously illuminate the affected area T being fit into the focal position of the objective lens 1 with a given illuminating area and a given intensity of light.

Furthermore, illuminating light from the first illuminating system L1 and illuminating light of the second illuminating system L2 can illuminate the affected area T in opposite oblique directions, evenly illuminating the affected area T of a small region viewed at high magnification.

The magnifying lenses 16 and 18 disposed in the second optical axis B are 50 times. The magnifying lenses 16 and 18 are exchangeable and can be exchanged with other magnifying lenses for other magnifications (e.g., 30 times and 40 times).

According to this invention, changing the location of the prism 14 as required enables switching a viewing optical path (passing channel of light beams reflected off the affected area T) from the first optical axis A for low magnifications to the second optical axis B for a fixed high magnification, providing a clear magnified image at high magnification and high resolution. This invention thus allows connection of small blood vessels (of a diameter of about 100 $\mu$m) and surgical operations on a cultured tissue produced by biotechnology, for example, which have been impossible by conventional microscopes. Further this invention indicates possible extensive new treatment fields in medical services, resulting in a large amount of demand for renewal or complete change of conventional medical equipment in the medical equipment field, and thus contributing to the development of the industrial field. It would be appreciated that this invention is not limited to applications to the medial field, and may be widely utilized in fields of research, manufacture and inspection, for example.

The present disclosure relates to subject matter contained in Japanese Patent Applications No. 2001-400052, filed on Dec. 28, 2001, the disclosure of which is expressly incorporated herein by reference in its entirety.

What is claimed is:

1. A variable magnification microscope, comprising:

an objective optical system;

a variable power optical system;

an eyepiece optical system, the variable power optical system and the eyepiece optical system being arranged on a first optical axis passing through the objective optical system;

a high power optical system arranged on a second optical axis, the second optical axis bypassing the variable power optical system between the objective optical system and the eyepiece optical system; and a reflecting means selectively disposed in the first optical axis between the objective optical system and the variable power optical system, the reflecting means diverting the first optical axis to the second optical axis.

2. A variable magnification microscope of claim 1, wherein:
   the variable power optical system is a low variable magnification optical system; and
   the high power optical system is a fixed magnification optical system of higher resolution and higher magnifying power than those of the variable power optical system.

3. A variable magnification microscope of claim 1, wherein:
   the second optical axis detours to the opposite side to the eyepiece optical system with respect to the first optical axis.

4. A variable magnification microscope of claim 1, further comprising:
   a first illuminating system for illuminating a field of view of the variable power optical system; and
   a second illuminating system for illuminating a field of view of the high power optical system, wherein
   with the variable power optical system selected, illuminating light only from the first illuminating system is emitted; and with the high power optical system selected, illuminating light from the first and the second illuminating systems is emitted.

5. A variable magnification microscope of claim 4, wherein:
   the illuminating location of the second illuminating system moves integrally with the objective optical system moving along the first optical axis.

6. A variable magnification microscope of claim 4 or 5, wherein:
   the illuminating light from the first and second illuminating systems is emitted in opposite directions toward the focal position of the objective optical system.

7. A variable magnification microscope of claim 5, wherein the second illuminating system is a collimator system.

8. A variable magnification microscope of claim 4, wherein:
   the illuminating light from the second illuminating system is emitted in an oblique direction toward the focal position of the objective optical system relative to the first optical axis; and
   the illuminating location of the second illuminating system moves integrally with the objective optical system moving along the first optical axis.

9. A variable magnification microscope of claim 4 including a first optical system, wherein the second illuminating system comprises:

a light source for producing a parallel light beam;
   a first reflecting means;
   a second reflecting means, between the first reflecting means and the second reflecting means the main axis of an optical path of the parallel light beam being parallel with the main axis of the first optical system, and the second reflecting means being fixed relative to the first optical system; and
   a third reflecting means fixed relative to the first optical system, the third reflecting means being off the main axis of the first optical system; and the optical path of the parallel light beam passing via the second reflecting means and the third reflecting means and intersecting the main axis of the first optical system at the focal position of the first optical system.

10. A variable magnification microscope of claim 9, wherein the first illuminating system comprises:
    a second light source producing a second light beam; and
    a fourth reflecting means for directing an optical path of the second light beam toward the focal position of the first optical system.

11. A variable resolution microscope, comprising:
    a first optical system, the first optical system being optically coupled to a second optical system via a first optical axis or via the first optical axis and a second optical axis;
    a third optical system having a first resolution, the first optical axis passing through the third optical system;
    a fourth optical system having a resolution higher than the first resolution, the second optical axis passing through the fourth optical system;
    at least one optical element disposed in the second optical axis for lengthening the optical length; an optical path switching element for selectively coupling an optical path passing through the first optical system to the first optical axis or the second optical axis; and
    an optical coupling means for optically coupling the second optical axis to the first optical axis between the third optical system and the second optical system.

12. A variable magnification microscope of claim 11 wherein, the first optical axis and the second optical axis each comprise a respective pair of optical axes.

13. A variable magnification microscope of claim 11 wherein, the first resolution is variable.

* * * * *